3,472,788
SUPPORTED METAL CYANIDE CATALYST
William E. Erner, Wilmington, Del., assignor to Air Products and Chemicals, Inc., Philadelphia, Pa., a corporation of Delaware
No Drawing. Original application Feb. 21, 1963, Ser. No. 260,308, now Patent No. 3,284,483, dated Nov. 8, 1966. Divided and this application Nov. 24, 1965, Ser. No. 578,900
Int. Cl. B01j *11/82;* C07c *121/50;* C01c *3/08*
U.S. Cl. 252—438                                                      3 Claims

ABSTRACT OF THE DISCLOSURE

A supported metal cyanide catalyst is prepared by impregnating a soluble salt such as a formate of a metal such as iron, cobalt, or nickel into a porous carrier such as macroporous silica. A gas stream comprising hydrogen cyanide is employed for transforming the catalyst to the metal cyanide form. The catalyst is useful in the conversion of aromatic halides to aromatic nitriles.

CROSS REFERENCE

This is a compulsory division of Ser. No. 260,308, filed Feb. 21, 1963 now 3,284,483.

This invention is directed to an improved process for the synthesis of aromatic nitriles from nuclearly halogenated aromatic hydrocarbons and to catalytic compositions particularly effective in bringing about the synthesis.

Nitriles, or organic cyanides are highly reactive organic compounds and have become one of the more important and widely used classes of organic materials. While the nitriles are esters of hydrocyanic acid and are readily hydrolyzed with acids or alkalies to form various carboxylic acid amides, acids and their salts, by far their most significant commercial use is in the production of aromatic dinitriles from which the phthalic acids and their amide polymers, alkyd resins and glyptal resins are made. Terephthalonitrile is especially valuable in the reduction of the dinitrile to p.xylylene diamine, which is phosgenated to p.xlyene diisocyanate, one of the aryl diisocyanates going into the manufacture of polyurethane rigid or elastic polymers, hard resins, cements, adhesives and foamed products. Aromatic nitriles are also readily polymerized under the action of sulfuric acid or sodium to 1,3,5-triazine ring compounds.

Nitriles have been synthesized from carboxylic acid ammonium salts or amides by distillation with a strong dehydrating agent such as phosphorus pentoxide. This involves relatively costly raw materials and is not a practical means for the production of nitriles at low cost. More recently nitriles have been made by passing carboxylic acids or esters in vapor phase with ammonia over alumina at 500° C. This, too, involves costly carboxylic acids and gives relatively poor yields of pure nitriles. The raw materials most practical commercially for nitrile production are the low cost organic halides, which, for example, may be reacted under pressure in liquid phase with potassium cyanide in dilute alcoholic solution to convert the halide to nitrile. However, under these conditions yields are poor and, due to competing reactions, malodorous isonitriles (carbylamines) are also formed and are present in the product. With a view toward developing more practical continuous processes, organic halides have been treated in vapor phase with hydrogen cyanide either at higher temperatures of the order of 1200° F. or above, in an essentially thermal reaction, or at more moderate temperatures, of the order of 900 to 1200° F., in the presence of metal and metal oxide catalysts. While fair conversions of halide to cyanide have been obtained under these conditions, product yield and selectivity have left much to be desired.

It is therefore an object of the present invention to provide a process for producing aromatic nitriles and particularly dinitriles from nuclearly halogenated aromatic hydrocarbons by reacting them in vapor phase with hydrogen cyanide in the presence of a selected catalyst, by means of which the reaction is effected with high selectivity to obtain cleaner reaction products in higher yields.

Another object of the present invention is to provide a process for the conversion of relatively low cost aryl chlorides to nitriles in a vapor phase reaction with hydrogen cyanide in the presence of selected cyaniding catalysts.

A further object of the present invention is the synthesis of aryl nitriles, particularly polynitriles, from aryl halides in a catalytic vapor phase reaction at relatively moderate temperatures.

These and other objects as are more fully disclosed in the following specification are accomplished in the manner herein described.

I have found that aromatic nitriles can be prepared in good yields by reacting a nuclearly halogenated aromatic hydrocarbon with from 1 to 4 times the stoichiometric amount of hydrogen cvyanide in vapor phase in the presence of a metal cyanide catalyst of the group consisting of iron, nickel or cobalt cyanide or multimolecular complexes of these metal cyanides, per se, or dispersions of one or more of these complexes on a solid high area porous carrier; the mixed vaporous charge being contacted with the catalyst at temperatures in the range of 700 to 1100° F. at atmospheric or moderate pressure at a space rate of 0.1 to 5 L.H.S.V. (liquid hourly space velocity).

More particularly, by the process of the invention, a nuclearly chlorinated aromatic compound, such as para or meta dichlorobenzene is converted to the corresponding dinitrile on being contacted in the vaporized state with at least the stoichiometric amount of HCN in the presence of cobalt cyanide as a catalyst distributed on a carrier, such as macroporous silica, at 800–900° F. at a space rate of about 0.6 L.H.S.V. and at atmospheric pressure.

The nuclearly haloginated aromatic-compounds which may be considered for conversion to nitriles by the process of the invention are the mono, di- and tricyclic compounds, preferably carbocyclia materials of the benzene and naphthalene series, and may include nuclearly halogenated pseudo-aromatic type compounds such as halothiophenes, pyridines, quinolines, pyrazines and imidazoles. The charge stocks successfully converted in the process are those having from one to four but preferably two halogen atoms substituted in the aryl nucleus, where the halogen is chlorine, bromine or iodine. It will be appreciated that, whereas chlorine, bromine and iodine substituted on an aryl nucleus show increasing reactivity in the order stated, the stability of these haloaromatics is generally in the reverse order, so that such aryl halides will be selected as are reactive and vaporizable under the conditions of the reaction without decomposition.

The catalyst found effective in the process is essentially a metal cyanide complex supported on a high area porous carrier. Since the catalyst is generally preformed, the description of a catalyst preparation in detail follows:

EXAMPLE I

Macroporous silica beads, exemplary of a high area porous catalyst support according to the process of the invention, having the desired porosity were prepared as follows:

High purity silica gel powder having an average particle size within the range of from 5 to 15 microns was suspended in an aqueous sodium silicate solution containing four times as much silica. The suspension was mixed with aqueous sulfuric acid to prepare a hydrosol, which was discharged onto the surface of a kerosene bath to form globules. As they fell through the kerosene the globules set to firm hydrogel beads. The beads were treated with aqueous ammonium nitrate as a base exchange step and then water washed, thereby removing all sodium salts from the silica. After hot aging, for about two hours, the purified silica beads were dried at a temperature above 250° F. but not greater than 350° F. in the presence of a high humidity atmosphere and then in air to a residual water content of less than 5 weight percent to provide powder-included silica gel beads in which more than 10% of the pore volume was provided by pores having a pore radius greater than 200 Angstroms, that is, a pore diameter greater than 0.04 micron.

To obtain catalyst of superior activity it is important to provide not only the suitable macroporous support but also to incorporate the catalytic metal cyanide in a proper manner. The method in the following description was effective.

A cobalt-containing solution was prepared by dissolving 1.32 kilograms of cobaltous formate dihydrate in 1.96 liters of concentrated ammonia (28% $NH_3$). The solution was treated for several minutes with $NH_3$ gas bubbled into and through the solution until there was no apparent take-up of the gas by the solution. The solution, amounting to 2.22 liters, was then added, slowly and with mild stirring, to 2.19 kilograms (5 liters) of the above-described macroporous silica beads. The admixture of solution with the beads was effected slowly, as noted above, to prevent loss or change of the components in the solution because of appreciable quantities of heat evolved during such admixture. All of the solution was incorporated with the beads, providing approximately 16% cobalt (as cobalt formate).

The impregnated beads were dried at 120° C. with through flow of dry air, and then activated by gradually heating to 900° F. over 2 hours while passing dry air through at a rate of 400 volumes of air per volume of catalyst beads per hour (v./v./hr.), and maintaining heating and air passage at 900° F. for 3 hours.

Hydrogen cyanide as a 40% mixture with 60% inert nitrogen was then passed through the catalyst bed at a rate of 100 v./v./hr. or 0.5 kiloliter/hr. for HCN, or at a rate of 250 v./v./hr. of the HCN—$N_2$ mixture to convert the cobalt (formate) to the cobalt cyanide. A sharply exothermic reaction, recorded as high as 350° F., was noted as passing through the catalyst bed. After three hours and a total passage of 1.5 kiloliters of HCN, the reaction was terminated with a total passage of 9 moles of HCN per g. atom of cobalt, a 200% excess of the HCN required for cobaltic cyanide $Co(CN)_3$, or the complex $[Co(CN)_3]_n$, where "$n$" has a value of 1 for monomeric cobalt cyanide, of a value of from 2 to 200+ for the cobalt cyanide molecular complex and where the bracketed formula is a conventional representation of a cobalt cyanide molecular complex but does not necessarily define the molecular configuration of the specified cobalt complex catalyst. The ratio of HCN to cobalt in the reaction should be not less than the stoichiometric ratio of 3 to 1. Since HCN is preferably introduced in a diluted form (with 40 to 80% by volume of nitrogen), it will be understood that an excess of 100 to 300% of HCN is preferred to effect complete conversion of cobalt to the tricyanide complex.

While a preferred complex cobalt cyanide catalyst on a macroporous silica support has been described in detail, other metal cyanides of metals capable of forming cyanide complexes such as metals of the VIII group of the periodic table, particularly cobalt, nickel and iron may be used. The metals may initially be impregnated as salts which, with an excess of HCN, are readily convertible to their cyanide complexes. Similarly other supports may be used, such as silica, clay, alumina, silica-alumina, or carbon in the various commercially available forms, where the carrier is preferably a material possessing high surface area with a further preference that a large portion of the total pore volume be constituted of pores having pore diameters greater than 0.04 micron.

In general, the replacement of halogen in the halogenated aromatic compound is effected by passing the molten aryl halide through a preheater where it is heated to approximately 500 to 700° F. and vaporized. The vapors then pass over and/or through the catalyst bed at 700 to 1100° F. at a space rate based upon the initial liquid halide of from 0.1 to 5 volumes of liquid per hour per volume of catalyst, though within this range, a space rate of 0.5 to 1.5 L.H.S.V. is preferred. Hydrogen cyanide gas is metered and passed concurrently through the preheater and into the reactor at a rate to introduce at least 2.0 moles of HCN per mole of dichloride and preferably from 4 to 6 moles of HCN per mole of dichloride and at a reactor bed temperature of 700 to 1100° F.

The hydrogen cyanide employed in the process may be of commercial grade as produced in any of the established commercial processes. While preformed HCN of known purity is preferred, processes of nitrilation have been described in which HCN is formed in situ in the presence of the aromatic halide, for example, by using carbon monoxide and ammonia, or by the decomposition of formamide.

As is more fully illustrated in the following examples, the more reactive halogenated aromatics are more readily converted to nitriles, for example, at lower temperatures. On the other hand, more vigorous conditions such as higher temperatures and lower space rates may be required to obtain high conversions of less reactive or polyhalogenated compounds to polynitriles.

The space rate at which reactants pass through the reactor and through the catalyst bed may be varied with the reactivity of the starting materials, the concentration of the HCN employed and to an extent with the age and activity of the catalyst, within the range, however, of the ratios of reactants and conditions above described.

EXAMPLE II

Molten p.dichlorobenzene from a heated charge pot (130° C.) was passed at 1 cc./min. through a ceramic chip-packed preheated at 250° C. together with a metered gaseous stream of cylinder HCN at a rate of 1 l./min., thence through the reactor containing a 100 cc. bed of cobalt cyanide complex catalyst on a porous silica bead support, prepared as described in Example I, at a temperature of 900° F. and at a space rate of 0.6 L.H.S.V. based on molten dichlorobenzene charge. The reactor effluent stream was first indirectly air cooled and then liquid cooled to effect the separation of gaseous and condensable products. The liquid product on further cooling crystallized to a white solid which was found to be essentially pure terephthalonitrile (p.dicyano-benzene), melting at 220° C. For a product of higher purity, a portion of the white solid product was melted and, after purging with nitrogen to remove traces of unconverted p.dichloro-benzene and 1-chloro-4-cyano-benzene, recrystallized from toluene. The recrystallized product had a melting point of 224° C. From 300 parts by weight of p.dichloro-benzene and 215 parts by weight of HCN (with HCN to Cl in a 2/1 ratio), 244 parts by weight of terephthalonitrile are obtained, corresponding to a yield of 95+%.

In the above example the cobalt content of the catalyst was 16% calculated as metallic cobalt. This specific formulation gave excellent conversions, as shown. However, the metallic content of the catalyst may be varied over a range of from 2 to 25% of metal while still producing an effective catalyst.

EXAMPLE III

The catalyst and process as described in Examples I and II is applied to m.dichloro-benzene for the production of isophthalonitrile (m.dicyano-benzene). From 300 parts of the m.dichloride and 162 parts of HCN, 204 parts by weight of isophthalonitrile are recovered, corresponding to a yield of 80% of theory. HCN for the displacement reaction is used in the ratio of 1.5 g. moles of HCN to 1.0 g. atoms of chloride.

EXAMPLE IV 47 parts by weight of p.dibromo-benzene, melting at 85° C. and 20 parts by weight of HCN (in a ratio of 1.75 HCN/Cl) are passed together through a vaporizer-preheater at 250° C., as described in Example II, and thence at atmospheric pressure through a catalyst bed consisting of complex nickel-cyanide on high area alumina, at 720° F. and at a 1.2 L.H.S.V. The product on separation and cooling as in Example II is mostly white solid terephthalonitrile melting at 220–222° C. The product terephthalonitrile, as received, is readily reduced with hydrogen to the diamine and converted to commercially desirable xylylene 1,4-diisocyanate by phosgenation.

In the above examples, as in a number of other exploratory runs, the halogenated aromatic compound was of a single species—essentially a pure compound free of isomers. However, the process is equally applicable to the conversion of mixed isomers, for example, mixtures of 1,3- and 1,4-dichlorobenzene; 2,4 and 2,6-dichloro-toluene; 1-chloro-4-bromobenzene and 1-chloro-3-bromo-benzene; 3-chloro and 4-chloro-benzylchloride, and the like.

EXAMPLE V 160 parts by weight of 2,4-dichloro-toluene and 4.0 g. atoms or 108 parts by weight of HCN are vaporized, preheated and charged to a cobalt cyanide complex on silica gel packed reactor, as described in Example II. At 920° F. and 0.35 L.H.S.V. the charge is converted to crystalline 2,4-dicyanotoluene in a yield of 75 weight percent of theory.

The proportion of HCN employed in the above conversions was generally in excess of the stoichiometric amount. The use of from 1.5 to 2.5 mols of HCN per halogen atom to be replaced is preferred. There is, however, a considerable safety or "convenience factor" present in the process of the invention residing in the nature and action of the complex cobalt cyanide catalyst. Since the cobalt cyanide complex may, in effect, participate in the reaction and be the cyanide carrier, modest changes in the HCN to halogen ratio in the materials entered in the reactor are apparently accommodated by the temporary release or pickup of HCN from the cyanide catalyst complex, thus the system is provided continuously with at least the stoichiometric requirement of cyanide for the conversion. In fact, the exchange reaction may be effected with the dispersed cobalt cyanide complex alone supplying the cyanide for the formation of aryl nitriles, however with diminishing effectiveness as the cyanide concentration decreases with cyanide loss from the cobalt complex. Thus, HCN introduced with aryl halide in at least the stoichiometric amount required for the displacement reaction will maintain the cobalt cyanide catalyst in fully cyanided active form and give the best yields of fully cyanided product.

While the cobalt cyanide complex catalyst preparation and use have been described as separate steps in Examples I and II respectively, it is to be noted that these two operations can be combined. Instead of treating the cobalt compound impregnated on a carrier such as silica or alumina with an $HCN-N_2$ gas mixture as in Example I, the dispersed cobalt compound on a calcined carrier can be subjected directly to contact with HCN and aryl halide vapors, preferably however, with a higher ratio of HCN in the reactor charge; thus to effect the formation of the cobalt cyanide complex in situ and to convert vaporized aryl halides to nitriles concurrently. By this method the initial aryl nitrile formation is somewhat inhibited until an effective concentration of the cobalt cyanide complex is formed. The process and equipment may nevertheless be simplified by carrying out the reaction in one step.

The process provides a versatile means of converting halogenated aromatic compounds to their corresponding nitriles. By this method and using the metal cyanide complex catalysts of cobalt, nickel and/or iron, a number of haloaryl compounds, other than in the above examples, are convertible to selected valuable mono-, di- and tri-nitriles, such as the following:

| Halide | Nitrile |
| --- | --- |
| 1,2-dibromo-benzene | 1,2-dicyano benzene (terephthalonitrile) |
| 1,3-dibromo-benzene | 1,3-dicyano benzene (isophthalonitrile) |
| Iodobenzene | cyano-benzene (benzo-nitrile) |
| 1,2,4-trichloro-benzene | 1,2,4-tricyano-benzene |
| 4-chloro-toluene | 4-cyano-toluene |
| 3-chloro-thiopene | 3-cyano-thiophene |
| 1-chloro-3-bromo naphthalene | 1,3-dicyano-naphthalene |
| 2-bromo-naphthalene | 2-cyano-naphthalene |

By reactions similar to those above, the process of the invention has been shown to be a new, practical and efficient method for the production of nitriles from aryl halides and particularly dinitriles from low cost aryl dichlorides. The reactions described have been carried out over fixed beds of solid catalysts. However, the process, being a reaction carried out in vapor phase, is readily translatable to fluid bed operation, particularly when such processes are extended to large commercial scale operation. The process is furthermore shown to be broadly applicable to the preparation of di- and polynitriles of aromatic compounds in good yields by means of a unique but readily prepared catalyst.

Obviously, many modifications and variations of the invention as hereinbefore set forth may be made without departing from the spirit and scope thereof, and therefore, only such limitations should be imposed as are defined in the appended claims.

What is claimed is:

1. A catalyst composition effective in the conversion of aromatic halogenated compounds to the corresponding nitriles consisting of metal cyanide dispersed on a porous, high area inorganic carrier selected from the group consisting of silica-alumina, silica, alumina, carbon and mixtures thereof, said metal being of the group consisting of iron, cobalt, nickel, and mixtures thereof, said metal being the cation of the metal cyanide.

2. The method for preparing the catalyst composition of claim 1, wherein the metal cyanide is cobalt cyanide prepared by (1) impregnating the porous inorganic carrier with a solution of a soluble cobalt salt, (2) heating gradually to 900° F. over a two hour period while passing air over the preparation and continuing the heating in air for about 3 hours, (3) passing a gas stream consisting of HCN together with an inert gas over the preparation in a ratio of at least 3.0 mols of HCN per g. atom of cobalt.

3. The method for preparing the catalyst composition of claim 1, wherein the inorganic porous carrier is high area macroporous silica, cobalt formate is impregnated into the silica, and a gas mixture consisting essentially of HCN gas and nitrogen in roughly equal volume proportions transforms the catalyst to a silica supported cobalt cyanide catalyst.

References Cited

UNITED STATES PATENTS

| | | | |
|---|---|---|---|
| 2,604,490 | 7/1952 | Reppe | 260—533 |
| 3,009,969 | 11/1961 | Spencer | 260—666 |
| 1,275,405 | 8/1918 | Dewar | 252—459 X |
| 1,511,520 | 10/1924 | Rees. | |

DANIEL E. WYMAN, Primary Examiner

P. M. FRENCH, Assistant Examiner

U.S. Cl. X.R.

23—79